C. B. BOYNTON.

RAILWAY AXLE BOX.

No. 3,963. Reissued May 10, 1870.

Witnesses

Shield Burr

H. H. Young

John B. Fletcher

Assignee

By David A. Burr

Attorney

United States Patent Office.

JOHN B. FLETCHER, OF ST. ALBANS, VERMONT, ASSIGNEE OF C. B. BOYNTON.

*Letters Patent No.* 70,793, *dated November* 12, 1867; *reissue No.* 3,963, *dated May* 10, 1870.

IMPROVEMENT IN RAILWAY AXLE-BOX.

The Schedule referred to in these Letters Patent and making part of the same.

C. B. BOYNTON, of St. Paul, in the county of Ramsey and State of Minnesota, did invent certain new and useful Improvements in the Axle-Boxes of Railway Cars, of which the following is an amended specification.

The first part of this invention relates to the combination of a lid or cover with the axle-box of a railway car, when said lid is pivoted at one end by means of a pivot-bolt inserted through the same at right angles to its face, so that it may swing or revolve thereon to cover and uncover the box without being lifted or detached therefrom, and is provided with a flange or catch on its upper edge, to prevent it from dropping too far when closed, and with a retaining spring or catch to secure it and prevent an accidental opening thereof, the object of this part of said invention being to obtain, with simplicity in construction and security of attachment, greater ease of movement in the lid, to facilitate access to the box.

The second part of the invention relates to the interposition of a spring between the head of the pivot-bolt and the lid of the axle-box, to bear with a constant elastic pressure upon the lid, powerfully enough to hold the latter firmly against or upon its bearing on the box, in every position to which it may be turned, operating thereby to lock the lid, and prevent all rattling or vibration thereof when closed, as well as to retain it in any desired position when opened.

In the accompanying drawings—

Figure 1:
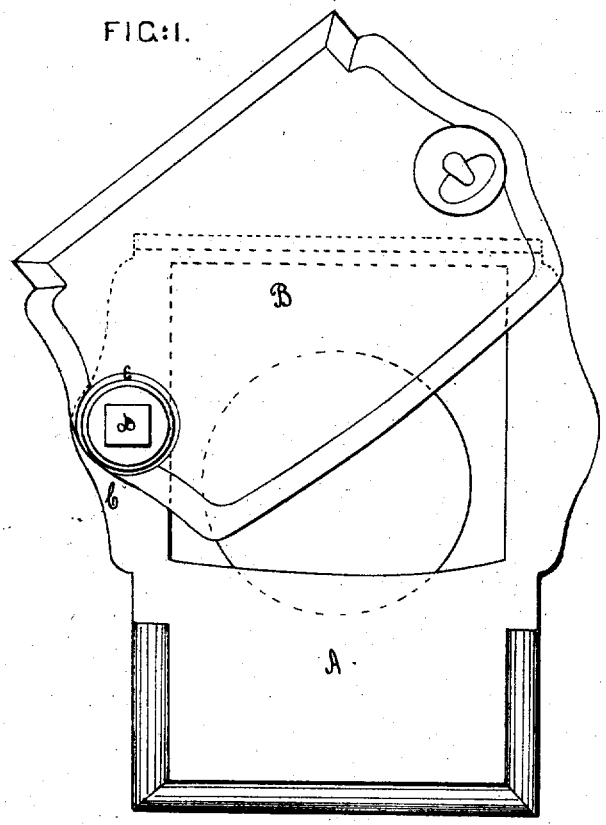

Figure 1 is a front view of the axle-box of a railroad car fitted with the improvements herein described.

Figure 2:
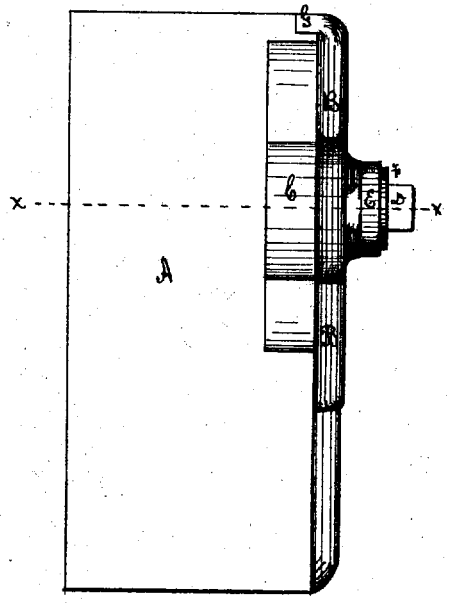

Figure 2, a side view of that end of the axle-box at which the lid is pivoted.

Figure 3:
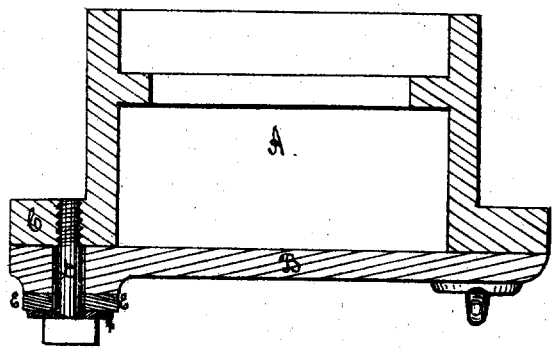

Figure 3, a cross-section in the line *x x* of fig. 2.

A is the axle-box, made of any desirable form, size, or description.

B, the revolving lid, made to cover the opening in the box. This lid consists of a simple, flat metallic plate, ornamented as desired, and cut to conform to and overlap the edges of the opening in the box.

C, a projecting lip, flange, or offset, formed at one end or side of the axle-box A, with its upper surface flush and continuous with the upper edge of the box surrounding its opening. This projection C is designed to receive the pivot-bolt securing the lid.

D, the pivot-bolt, which secures the lid upon the box A, (see fig. 3.) This bolt is inserted through simple apertures formed in one end of the lid B, and in the flange or offset C of the box A, and is retained in place by a nut on its lower end, or else it is inserted through the simple aperture in the lid and screwed into a threaded aperture in the box A, or in its offset or flange C, as illustrated in the drawings.

E, a spring encirling the bolt D, between its head and the lid or cover B, to press upon and retain the lid in position.

F, a washer, placed upon the spring E under the head of the bolt D, to give the latter a more effectual bearing on the spring.

G, a flange or rim turned in on the upper edge of the lid B, and projecting sufficiently to overlap the upper edge of the box A, or to fit into a counterpart, rebate, or recess formed along said edge to receive it, as illustrated in fig. 2. This inturned lip or flange G serves to support the lid and prevent its falling downward from its proper place when closed.

The spring E may be made of metal or of India rubber, and may be of any suitable form to exert an elastic pressure between the head of the bolt and the lid. As illustrated in the drawings, it is made of India rubber in the simplest form. The tension or pressure thereof is increased or diminished at pleasure by tightening or loosening the bolt.

I claim herein as new—

1. A lid or cover for the axle-box of a railroad car, when said lid is pivoted at one end to said box, so as to revolve or swing over the opening therein, and is provided with a flange or catch on its upper edge, to arrest its downward movement, and with a spring or catch to hold and retain it when closed, all substantially in the manner herein set forth.

2. A spring, interposed between and combined with the revolving lid of a car-axle box and the head of the pivot upon which it turns or swings, substantially as and for the purpose herein set forth.

JOHN B. FLETCHER,
*Assignee of C. B. Boynton.*

Witnesses:
EUGENE PUTNAM,
GUY I. NOBLE.